(12) United States Patent
Wada et al.

(10) Patent No.: US 12,304,183 B2
(45) Date of Patent: May 20, 2025

(54) FLAME-RESISTANT LAYERED MOLDED ARTICLE

(71) Applicant: TORAY INDUSTRIES, INC., Tokyo (JP)

(72) Inventors: Makoto Wada, Nagoya (JP); Masaru Harada, Otsu (JP); Kazuya Okubo, Nagoya (JP); Osamu Niwa, Nagoya (JP); Hiroshi Kiyama, Nagoya (JP)

(73) Assignee: TORAY INDUSTRIES, INC., Tokyo (JP)

( * ) Notice: Subject to any disclaimer, the term of this patent is extended or adjusted under 35 U.S.C. 154(b) by 316 days.

(21) Appl. No.: 17/631,217

(22) PCT Filed: Oct. 2, 2020

(86) PCT No.: PCT/JP2020/037565
§ 371 (c)(1),
(2) Date: Jan. 28, 2022

(87) PCT Pub. No.: WO2021/070747
PCT Pub. Date: Apr. 15, 2021

(65) Prior Publication Data
US 2022/0266578 A1 Aug. 25, 2022

(30) Foreign Application Priority Data
Oct. 10, 2019 (JP) .................. 2019-186739

(51) Int. Cl.
*B32B 27/12* (2006.01)
*B32B 7/027* (2019.01)
*B32B 7/10* (2006.01)

(52) U.S. Cl.
CPC ............. *B32B 27/12* (2013.01); *B32B 7/027* (2019.01); *B32B 7/10* (2013.01); *B32B 2250/02* (2013.01);
(Continued)

(58) Field of Classification Search
None
See application file for complete search history.

(56) References Cited

U.S. PATENT DOCUMENTS 5,024,877 A * 6/1991 McCullough, Jr ........ B32B 5/22
428/408
2018/0187351 A1 7/2018 Tsuchikura et al.
2021/0001596 A1 1/2021 Harada et al.

FOREIGN PATENT DOCUMENTS

JP 3-96341 A 4/1991
JP 2000-8260 A 1/2000
(Continued)

OTHER PUBLICATIONS

Machine Translation of WO2019188276 (Year: 2019).*
(Continued)

*Primary Examiner* — Shawn Mckinnon
(74) *Attorney, Agent, or Firm* — Birch, Stewart, Kolasch & Birch, LLP

(57) ABSTRACT

The present invention is a flame-resistant layered molded article in which one surface of a fiber sheet material containing at least infusible fibers A, particularly a fiber sheet material containing infusible fibers A and thermoplastic fibers B, is exposed to the outside of a molded article, and in which at least a part of the other surface side is joined to a thermoplastic resin C forming a molded article body. As a flame-resistant layered molded article, the present invention can realize to exhibit the high flame resistance and flame-shielding property that are required, and to ensure the desired strength and stiffness and good moldability that are required overall.

14 Claims, 2 Drawing Sheets

1: Fiber sheet material
2: Thermoplastic resin C

(52) U.S. Cl.
CPC ... *B32B 2262/14* (2013.01); *B32B 2307/3065* (2013.01); *B32B 2307/732* (2013.01); *B32B 2457/10* (2013.01)

(56) References Cited

FOREIGN PATENT DOCUMENTS

| | | |
|---|---|---|
| JP | 2013-169996 A | 9/2013 |
| JP | 2017-114107 A | 6/2017 |
| WO | WO 2017/006897 A1 | 1/2010 |
| WO | WO 2019/188276 A1 | 10/2019 |

OTHER PUBLICATIONS

International Search Report, issued in PCT/JP2020/037565, PCT/ISA/210, dated Nov. 17, 2020.
Written Opinion of the International Searching Authority, issued in PCT/JP2020/037565, PCT/ISA/237, dated Nov. 17, 2020.

\* cited by examiner

1: Fiber sheet material
2: Thermoplastic resin C

3: Fiber sheet material
4: Thermoplastic resin C

5: Battery module and pack
6: Battery module
7: Flame-resistant layered molded article
(fiber sheet material + thermoplastic resin C)

FLAME-RESISTANT LAYERED MOLDED ARTICLE

TECHNICAL FIELD OF THE INVENTION

The present invention relates to a flame-resistant layered molded article, in particular, relates to a flame-resistant layered molded article in which a specific fiber sheet material is provided on an outer surface of a resin molded article so that a high flame resistance is given to the surface of the molded article.

BACKGROUND ART OF THE INVENTION

Resin molded articles are used in various fields from the viewpoint of lightness and excellent moldability to a predetermined shape, but depending upon the application, a high flame retardance or flame resistance, and further, a flame shielding property may be required. In particular, a high flame retardance or flame resistance, and further, a flame shielding property may be required mainly to the surface or the surface layer of resin molded articles.

As a method of imparting a flame retardance to a resin molded article itself, there is a method of kneading a chemical having a flame-retardant effect into the resin, but the degree of flame retardance imparted to the molded article by such a method is limited, and in particular, it is difficult to give a high flame resistance or flame shielding property to the molded article itself.

On the other hand, as non-woven fabric or fibrous paper, for example, a non-woven fabric (for example, Patent document 1) or a paper (for example, Patent document 2) made of a composite comprising infusible fibers (for example, flame-resistant yarn) and fibers made of polyphenylene sulfide or the like as a polymer having a high flame retardance are known. While it is possible that such a non-woven fabric or paper itself exhibits a high flame resistance or flame shielding property, it is difficult to form a molded article having desired strength and stiffness with the non-woven fabric or paper itself, and even if it can be molded, because it requires the non-woven fabric or paper to be fairly thick, it is likely to be extremely expensive. Moreover, it is difficult to secure a good moldability.

PRIOR ART DOCUMENTS

Patent Documents

Patent document 1: JP-A-2013-169996
Patent document 2: WO 2017/6807

SUMMARY OF THE INVENTION

Problems to be Solved by the Invention

Accordingly, in view of the above-described circumstances, an object of the present invention is to provide a flame-resistant layered molded article capable of exhibiting high flame resistance and flame shielding property required on the surface or the surface layer of a resin molded article, and capable of easily ensuring desired strength, stiffness, and further, good moldability to a desired shape that are required as a whole of a molded article.

Means for Solving the Problems

To achieve the above-described object, the present invention employs the following means.

(1) A flame-resistant layered molded article in which one surface of a fiber sheet material containing at least infusible fibers A is exposed to the outside of a molded article and at least a part of the other surface side is joined to a thermoplastic resin C forming a molded article body.
(2) The flame-resistant layered molded article according to (1), wherein the fiber sheet material comprises the infusible fibers A and thermoplastic fibers B.
(3) The flame-resistant layered molded article according to (1) or (2), wherein a thermal conductivity of the infusible fibers A determined based on ISO22007-3 (2008) is 0.060 W/m·K or less.
(4) The flame-resistant layered molded article according to any one of (1) to (3), wherein the content of the infusible fibers A in the fiber sheet material is 15 to 80% by weight.
(5) The flame-resistant layered molded article according to any one of (2) to (4), wherein the content of the thermoplastic fibers B in the fiber sheet material is 20 to 85% by weight.
(6) The flame-resistant layered molded article according to any one of (2) to (5), wherein the fiber sheet material contains 20% by weight or less of fibers D other than the infusible fibers A and the thermoplastic fibers B.
(7) The flame-resistant layered molded article according to any one of (1) to (6), wherein the infusible fibers A are flame resistant fibers or meta-aramid-based fibers.
(8) The flame-resistant layered molded article according to any one of (2) to (7), wherein a LOI value of the thermoplastic fibers B determined based on JIS K7201-2 (2007) is 25 or more.
(9) The flame-resistant layered molded article according to any one of (2) to (8), wherein the thermoplastic fibers B are fibers comprising a resin selected from the group consisting of an anisotropic fusible polyester, a liquid crystal polyester, a flame-retardant poly (butylene terephthalate), a poly (acrylonitrile butadiene styrene), a flame-retardant polysulfone, a poly (ether-ether-ketone), a poly (ether-ketone-ketone), a polyethersulfone, a polyarylate, a polyarylene sulfide, a polyphenylsulfone, a polyetherimide, a polyamideimide and a mixture thereof.
(10) The flame-resistant layered molded article according to any one of (2) to (9), wherein the thermoplastic fibers B are fibers containing 15% by weight or more of a sulfur atom.
(11) The flame-resistant layered molded article according to any one of (1) to (10), wherein a LOI value of the thermoplastic resin C determined based on JIS K7201-2 (2007) is 25 or more.
(12) The flame-resistant layered molded article according to any one of (1) to (11), wherein the thermoplastic resin C comprises a resin selected from the group consisting of an anisotropic fusible polyester, a liquid crystal polyester, a flame-retardant polyamide 66, a flame-retardant poly (butylene terephthalate), a poly (acrylonitrile butadiene styrene), a flame-retardant polysulfone, a poly (ether-ether-ketone), a poly (ether-ketone-ketone), a polyethersulfone, a polyarylate, a polyarylene sulfide, a polyphenylsulfone, a polyetherimide, a polyamideimide and a mixture thereof.
(13) The flame-resistant layered molded article according to any one of (2) to (12), wherein a part of the thermoplastic fibers B and a part of the thermoplastic resin C are fused to each other.
(14) The flame-resistant layered molded article according to any one of (2) to (13), wherein the thermoplastic fibers B and the thermoplastic resin C are made of the same resin, and a joint strength between the fiber sheet material containing the infusible fibers A and the thermoplastic fibers B and the thermoplastic resin C is 1.5 kg/cm² or more.

(15) The flame-resistant layered molded article according to any one of (2) to (14), wherein the fiber sheet material containing the infusible fibers A and the thermoplastic fibers B is formed as a fiber sheet material capable of exhibiting a flame shielding property by forming a film between the infusible fibers A by melting the thermoplastic fibers B and carbonizing the film under an oxygen blocking condition.

(16) The flame-resistant layered molded article according to any one of (2) to (15), wherein the fiber sheet material containing the infusible fibers A and the thermoplastic fibers B is thermally welded with the thermoplastic resin C, and the thickness of a compatible welded layer formed between the thermoplastic fibers B and the thermoplastic resin C is 10 μm or more.

(17) The flame-resistant layered molded article according to any one of (1) to (16), wherein the fiber sheet material containing the infusible fibers A is partially present on a surface of the thermoplastic resin C.

Effect According to the Invention

In the flame-resistant layered molded article according to the present invention as described above, the fiber sheet material itself containing infusible fibers A can exhibit high flame resistance and flame shielding property due to the presence of infusible fibers A, and since one surface of the fiber sheet material is joined to the molded article body formed with the thermoplastic resin C at a condition being exposed to the outside, it becomes possible also for the surface portion of the layered molded article as a whole to efficiently exhibit high flame resistance and flame shielding property. At the same time, since the molded article body can be easily molded into a desired shape by substantially any molding method using the thermoplastic resin C, also as the whole of the layered molded article, it becomes possible to be easily formed into a desired shape at a low cost and with a good moldability while securing desired strength and stiffness due to the molded article body. Therefore, as the flame-resistant layered molded article, it becomes possible to realize to exhibit high flame resistance and flame shielding property that are required, and to ensure desired strength and stiffness and good moldability that are required overall.

EMBODIMENTS FOR CARRYING OUT THE INVENTION

Figure 1:
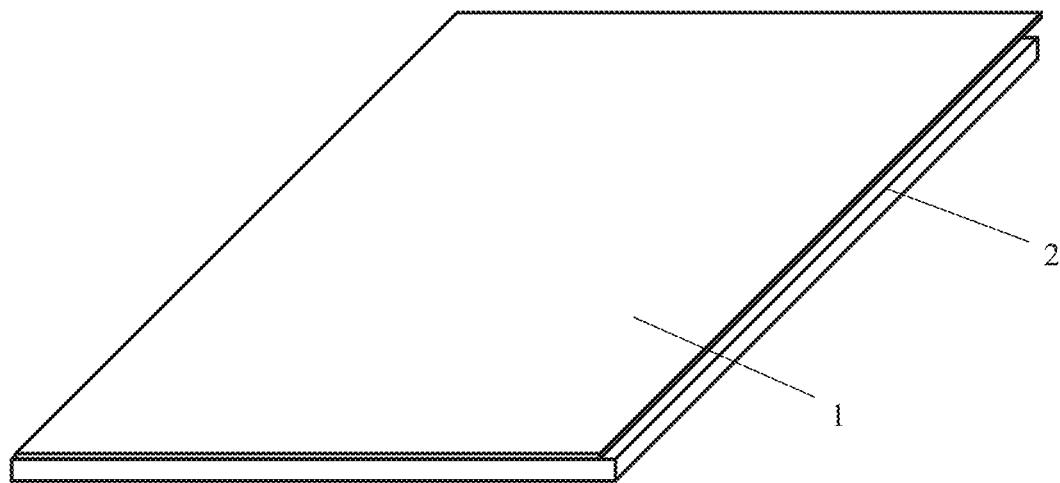
FIG. 1 is a perspective view showing an example of a test piece of a flame-resistant layered molded article according to the present invention.

A flame-resistant layered molded article according to the present invention is characterized in that one surface of a fiber sheet material containing at least infusible fibers A is exposed to the outside of a molded article and at least a part of the other surface side is joined to a thermoplastic resin C forming a molded article body.

As the fiber sheet material containing at least infusible fibers A, a woven fabric, a knitted fabric, a felt, a paper, and the like can be used, and a material after short fibers and long fibers are processed in a known manner can be used. Among them, from the viewpoint of flame resistance, a non-woven fabric is preferred. Further, although the thickness of the fiber sheet material is not particularly limited, it is preferably 0.05 to 10 mm, from the viewpoint of reducing the weight and the cost, and improving the performance of the layered molded article.

The infusible fibers A in the present invention means fibers which do not liquefy and maintain their fiber shape when exposed to a flame, preferably those which do not liquefy and ignite at a temperature of 800° C., and more preferably those which do not liquefy and ignite at a temperature of 1,000° C. or higher. As such infusible fibers A, for example, flame resistant fibers, meta-aramid-based fibers and glass fibers can be exemplified. The flame resistant fibers are fibers which have been subjected to flame resistant treatment using fibers selected from acrylonitrile-based, pitch-based, cellulose-based, and phenol-based fibers as a raw material. These may be used alone or two or more kinds may be used at the same time. Among them, flame resistant fibers having a low high-temperature shrinkage percentage and further improved with thermal resistance at high temperature by an oxygen blocking effect due to the film formed at the time of flame contact of the thermoplastic fiber B, thereby promoting carbonization, that is described later, are preferred. Among various flame resistant fibers, acrylonitrile-based flame resistant fibers are more preferably used as fibers having a small specific gravity, a flexibility and an excellent flame retardance, and such flame resistant fibers can be obtained by heating and oxidizing acrylic fibers as a precursor in a high-temperature air. As commercially available products, exemplified are flame resistant fibers supplied by Zoltek Corporation "PYRON" (registered trademark), "Pyromex" (registered trademark) supplied by Toho Tenax Co., Ltd., etc. which were used in Examples and Comparative Examples described later. Here, the high-temperature shrinkage percentage means a value determined by leaving fibers as they are in a standard state (20° C., relative humidity: 65%) for 12 hours, then measuring the original length L0 at a condition of applying a tension of 0.1 cN/dtex, exposing the fibers to a dry heat atmosphere of 290° C. for 30 minutes without applying a load, sufficiently cooling the fibers in a standard state (20° C., relative humidity: 65%), and then measuring the length L1 at a condition of applying a tension of 0.1 cN/dtex to the fibers, and calculating the value from L0 and L1 by the following equation.

$$\text{High-temperature shrinkage percentage} = [(L0-L1)/L0] \times 100 (\%)$$

The infusible fibers A in the present invention preferably have a thermal conductivity of 0.060 W/m·K or less determined by a method based on ISO22007-3 (2008). Thermal conductivity is a numerical value of the ease of thermal conduction, and small thermal conductivity means that when a material is heated from one surface side, the temperature rise of the unheated part becomes small. A material with a thermal conductivity of 0.060 W/m·K or less determined by a method based on ISO22007-3 (2008), using a felt with a weight per unit area of 200 g/m² and a thickness of 2 mm (density: 100 kg/m³) measured by a method based on JIS L1913 (2010) as a test piece, is difficult to transfer heat, and when it is made into a non-woven fabric and heated from one surface side, it is possible to suppress the temperature rise on the other side that is not heated, and even if a combustible material is placed on the opposite side, the possibility that the combustible material will ignite is reduced. Although it is preferable that the thermal conductivity is low, the lower limit of commercially available fiber materials is about 0.020 W/m·K.

Further, the infusible fibers A preferably used in the present invention are preferably used by a method of using infusible fibers alone or compounding them with a different material, and it is preferred to use by compounding infusible fibers A and a thermoplastic resin B.

The thermoplastic fiber B in the present invention preferably has a LOI value (Limiting Oxygen Index) of 25 or more based on JIS K7201-2 (2007). The LOI value is a volume percentage of the minimum amount of oxygen required to sustain combustion of a substance in a mixed gas of nitrogen and oxygen, and it can be said that the higher the LOI value, the harder it is to burn. Therefore, thermoplastic fibers having a LOI value of 25 or more based on JIS K7201-2 (2007) are hard to burn, and even if they ignite, they are extinguished immediately when the fire source is released, and usually a carbonized film is formed on a part that has spread slightly to be burned, and this carbonized part can prevent the spread of fire. Although it is preferable that the LOI value is high, the upper limit of the LOI value of an actual commercially available substance is about 65.

As the concrete examples of the thermoplastic fibers B in the present invention, exemplified are fibers formed with a thermoplastic resin selected from the group consisting of an anisotropic fusible polyester, a liquid crystal polyester, a flame-retardant poly (butylene terephthalate), a poly (acrylonitrile butadiene styrene), a flame-retardant polysulfone, a poly (ether-ether-ketone), a poly (ether-ketone-ketone), a polyethersulfone, a polyarylate, a polyarylene sulfide, a polyphenylsulfone, a polyetherimide, a polyamideimide and a mixture thereof. These may be used alone or two or more kinds may be used at the same time. When the LOI value is in the preferable range of the present invention, combustion in the air is suppressed and the thermoplastic resin is easily carbonized. Further, since the melting point is lower than the ignition temperature of infusible fibers A, the molten thermoplastic resin forms a film between the surfaces of infusible fibers A and the fibers, and further it is carbonized, the effect of blocking oxygen is enhanced, oxidative deterioration of the infusible fibers A can be suppressed, and the carbonized film exhibits an excellent flame shielding property. The melting point of the thermoplastic fibers B is preferably lower than the ignition temperature of the infusible fibers A by 200° C. or more, more preferably by 300° C. or more. Among these, polyphenylene sulfide fibers (hereinafter, may be referred to as PPS fibers) is most preferable from the viewpoint of high LOI value, range of melting point and easy availability. Further, even a thermoplastic resin whose LOI value is not within the range specified by the present invention can be preferably used as long as the LOI value after treatment is within the range specified by the present invention by treating with a flame retardant.

PPS fibers preferably used in the present invention are synthetic fibers comprising a polymer containing —($C_6H_4$—S)— as its main structural unit. As the typical examples of the PPS fibers containing the above-described structural unit, exemplified are a polyphenylene sulfide (hereinafter, may be referred to as PPS), a polyphenylene sulfide sulfone, a polyphenylene sulfide ketone, a random copolymer and a block copolymer thereof, mixtures thereof, etc. Particularly preferable PPS fibers desirably comprise a polyphenylene sulfide containing p-phenylene sulfide unit represented by —($C_6H_4$—S)— as the main structural unit of the polymer preferably at 90 mol % or more. PPS fibers comprising the polyphenylene sulfide containing p-phenylene sulfide unit at 80% by weight or more, further 90% by weight or more, are desired.

By containing sulfur atoms in the structure of the thermoplastic resin forming the thermoplastic fibers B or in the flame retardant compounded as an additive in the thermoplastic resin, a sulfuric acid is generated during the thermal decomposition of the polymer or the flame retardant, and it becomes possible to exhibit a mechanism for dehydrating and carbonizing the polymer base material. From the viewpoint of containing sulfur atoms, PPS fibers are most preferable as the thermoplastic fibers B. Further, in case where a flame retardant is used, a sulfur-based flame retardant is preferable. As the thermoplastic fibers B, it is preferred to use fibers containing 15% by weight or more of sulfur atoms. Concretely, PPS or a polyester to which a sulfur-based flame retardant is added is exemplified. The upper limit of the ratio of sulfur atoms is preferably 50% by weight or less from the viewpoint of fiber strength. Where, the ratio of sulfur atoms referred to here is determined by using a thermogravimetric analyzer to raise the temperature of a sample of about 10 mg from a room temperature to 800° C. at a condition of 10° C./min under an air flow condition to oxidatively decompose the thermoplastic fibers, and quantitatively analyzing the sulfur oxides in the decomposition gas by gas chromatography.

The fiber sheet material in the present invention preferably contains infusible fibers A and thermoplastic fibers B. If the mixing ratio of the thermoplastic fibers B in the fiber sheet material is too low, since the thermoplastic fibers B do not spread sufficiently in a film shape between the infusible fibers A of the aggregate, the mixing ratio of the thermoplastic fibers B in the fiber sheet material is preferably 20% by weight or more, more preferably 30% by weight or more. If the mixing ratio of the thermoplastic fibers B becomes too high, since the carbonized portion tends to become brittle at the time of flame contact and the flame shielding property is reduced, the upper limit is preferably 85% by weight or less, and more preferably 75% by weight or less.

The fiber sheet material in the present invention may contain fibers D other than infusible fibers A and thermoplastic fibers B in order to further add specific performance to the fiber sheet material. For example, in order to improve hygroscopicity and water absorption, vinylon fibers, polyester fibers other than thermoplastic fibers B, nylon fibers and the like may be used. The mixing ratio of the fibers D is not particularly limited as long as the effect of the present invention is not impaired, but the mixing ratio of the fibers D other than the infusible fibers A and the thermoplastic fibers B is preferably 20% by weight or less, and more preferably 15% by weight or less. The lower limit when the fibers D are used is not particularly limited as long as the desired performance is added, but it is usually preferably about 10% by weight.

The thermoplastic resin C forming the molded article body of the flame-resistant layered molded article of the present invention preferably has a LOI value of 25 or more based on JIS K7201-2 (2007). The LOI value is a volume percentage of the minimum amount of oxygen required to sustain combustion of a substance in a mixed gas of nitrogen and oxygen, and it can be said that the higher the LOI value, the harder it is to burn. Therefore, a thermoplastic resin having a LOI value of 25 or more based on JIS K7201-2 (2007) is hard to burn, and even if it ignites, the fire is extinguished immediately when the fire source is released, and usually a carbonized film is formed on a part that has spread slightly to be burned, and this carbonized part can prevent the spread of fire. Although it is preferable that the LOI value is high, the upper limit of the LOI value of an actual commercially available substance is about 65.

As concrete examples of the thermoplastic resin C in the present invention, it is preferably a thermoplastic resin selected from the group consisting of an anisotropic fusible polyester, a liquid crystal polyester, a flame-retardant polyamide 66, a flame-retardant poly (butylene terephthalate), a poly (acrylonitrile butadiene styrene), a flame-retardant polysulfone, a poly (ether-ether-ketone), a poly (ether-ketone-ketone), a polyethersulfone, a polyarylate, a polyarylene sulfide, a polyphenylsulfone, a polyetherimide, a polyamideimide and a mixture thereof. These may be used alone or in combination of two or more.

Polyphenylene sulfide resin preferably used in the present invention (hereinafter, it may be referred to as PPS resin) is a polymer having —($C_6H_4$—S)— as its main structural unit. As the typical examples of these PPS resins, exemplified are a polyphenylene sulfide, a polyphenylene sulfide sulfone, a polyphenylene sulfide ketone, a random copolymer and a block copolymer thereof, mixtures thereof, etc. Particularly preferable PPS resin desirably comprises a polyphenylene sulfide resin containing p-phenylene sulfide unit represented by —($C_6H_4$—S)— as the main structural unit of the polymer preferably at 90 mol % or more. A polyphenylene sulfide resin containing p-phenylene sulfide unit at 80% by weight or more, further 90% by weight or more, is desired.

The thermoplastic resin C forming the molded article body of the flame-resistant layered molded article of the present invention may be added with various additives such as the above-described sulfur-based flame retardants, reinforcing fibers such as carbon fibers and glass fibers, flame retardants other than the sulfur-based flame retardants, antioxidants, thermal stabilizers, ultraviolet absorbents, lubricants, colorants or crystallization accelerators, in a range in which the object of the present invention is not impaired. In particular, from the viewpoint of the strength and stiffness of the layered molded article, it is preferred to compound reinforcing fibers such as carbon fibers and glass fibers. These additives may be used alone or in combination.

The flame-resistant layered molded article of the present invention is characterized in that one surface of the fiber sheet material is exposed to the outside of the molded article, and at least a part of the other surface side is joined to the thermoplastic resin C forming the molded article body. As a method for joining the fiber sheet material and the thermoplastic resin C to produce a layered molded article, exemplified are methods such as hot pressing, vibration welding and laser welding, and a method due to injection molding. Concretely, exemplified are a method of loading the fiber sheet material and the molded article containing the thermoplastic resin C into a hot press device and applying a pressure while applying a heat to join them, a method of placing the fiber sheet material in the thermoplastic resin molded article, and partially melt welding them using a heater heat source, a high energy density heat source such as electron beam or laser beam, or a heat source induced and heated by high frequency or electromagnetic wave, a method of pre-installing the fiber sheet material in a mold, filling the thermoplastic resin C into a mold and performing injection molding, etc. Among them, the injection molding method is preferred from the viewpoint of joint strength and production cost.

Among them, in case where the fiber sheet material contains the thermoplastic fibers B, it is preferable that a part of the thermoplastic resin B and a part of the thermoplastic resin C forming the molded article body are fused to each other. By fusing these, the joint strength between the fiber sheet base material and the molded article can be improved.

Further, in the flame-resistant layered molded article of the present invention, it is preferred that the thermoplastic fibers B and the thermoplastic resin C are the same resin. If these resins are the same, when the thermoplastic fibers B and the thermoplastic resin C are melted, the compatibility therebetween is improved, and the joint strength between the fiber sheet material containing the thermoplastic fibers B and the thermoplastic resin C is increased. In the present invention, the joint strength is preferably 1.5 kg/cm$^2$ or more. When the joint strength is 1.5 kg/cm$^2$ or more, even in a state where the flame-resistant layered molded article is exposed to flame, the fiber sheet material and the molded article are not separated, and are not peeled off due to the shrinkage difference between the fiber sheet material and the thermoplastic resin C caused by the temperature change under the environment in which the layered molded article is used, and a sufficient flame resistance effect can be exhibited.

In the flame-resistant layered molded article of the present invention, in case where the fiber sheet material is a fiber sheet material containing infusible fibers A and thermoplastic fibers B, the mechanism for exhibiting a particularly excellent flame shielding property is as follows. When the fiber sheet material containing the infusible fibers A and the thermoplastic fibers B comes into contact with flame, the thermoplastic fibers B are melted and formed into a film so as to fill the space between the infusible fibers A. The film formation of the thermoplastic fibers B blocks the contact between the infusible fibers A and oxygen, and as a result, the infusible fibers A are carbonized. The flame shielding property is exhibited by the carbonized film thus completed.

In the flame-resistant layered molded article of the present invention, in case where the fiber sheet material is a fiber sheet material containing infusible fibers A and thermoplastic fibers B, the fiber sheet material and the thermoplastic resin C are thermally welded, and the thickness of the resulted compatible welded layer between the thermoplastic fibers B and the thermoplastic resin C is preferably 10 μm or more. By setting the thickness of the compatible welded layer to 10 μm or more, even in a state where the flame-resistant layered molded article is exposed to flame, the fiber sheet material and the molded article are not separated, and are not peeled off due to the shrinkage difference between the fiber sheet material and the thermoplastic resin C caused by the temperature change under the environment in which the layered molded article is used, and a sufficient flame resistance effect can be exhibited.

Where, the thickness of the compatible welded layer can be determined by the following method. After the layered molded article comprising the fiber sheet material and the thermoplastic resin C is cut to a predetermined size, the cross section is observed with a backscattered ray using a scanning electron microscope (supplied by JEOL Ltd.), at a magnification of 200 times. The observation width is about 600 μm, and at 5 cross-sectional positions at 100 μm equal intervals excluding both ends, the distance from the surface of the layered molded article where the fiber sheet material is partially present to the farthest infusible fibers A and the distance from the same surface of the layered molded article to the farthest unfused interface between the thermoplastic fibers B and the thermoplastic resin C are measured, and the value of subtracting the former distance from the latter distance is referred to as the thickness of the compatible welded layer, and it was determined as an average value of the 5 cross-sectional positions.

The flame-resistant layered molded article of the present invention is in a state in which the fiber sheet material is at least partially present on the surface of the thermoplastic resin C. With respect to the flame shielding effect, the flame shielding property and flame resistance are exhibited when the flame is applied toward the fiber sheet material from the side where the fiber sheet material exists. Namely, in the flame-resistant layered molded article, the shape is such that the fiber sheet material exists in the portion where the flame comes into direct contact. Where, the flame shielding property in the present invention means that the flame is effectively blocked, and the flame resistance means that combustion by flaming up is not sustained even if catching fire.

The flame-resistant layered molded article of the present invention can be applied to the fields of housing, aircraft, automobiles, etc. by taking advantage of its high flame shielding property and flame resistance. In particular, it is useful for battery modules and packs, which are installed in xEV automobiles (electric vehicles) and for which flame resistance standards are provided as national regulations from the viewpoint of safety.

Figure 3:
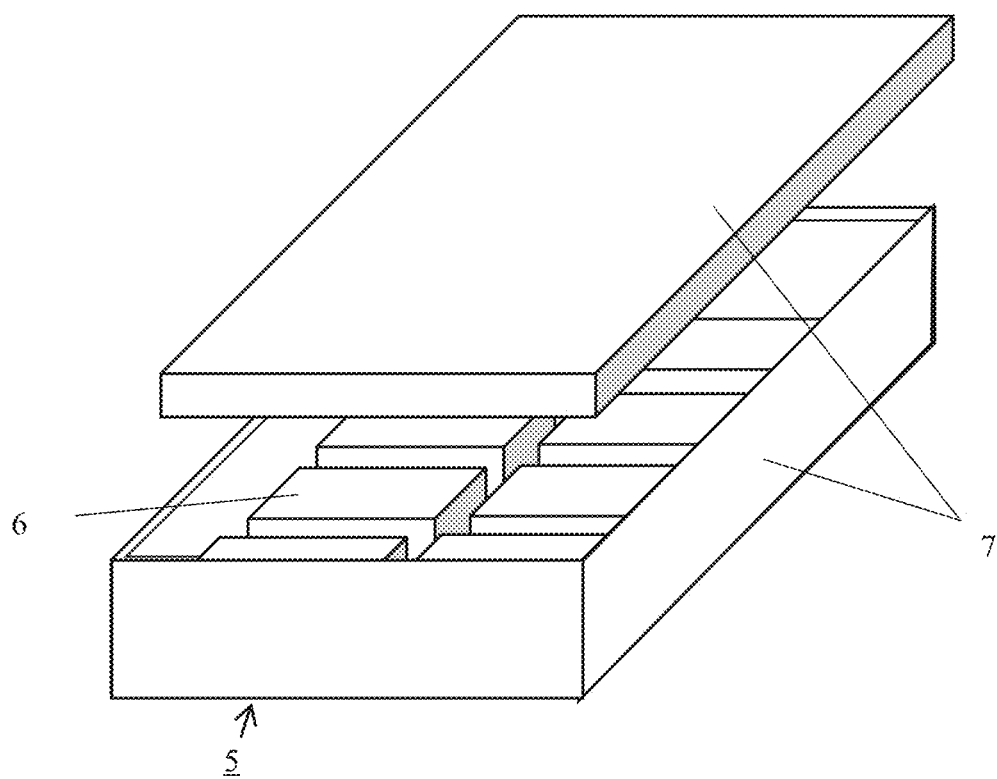
FIG. 3 is a perspective view showing an example of a battery module and pack as an embodiment of a flame-resistant layered molded article according to the present invention.

FIG. 3 shows an example of a battery module and pack as an embodiment of a flame-resistant layered molded article according to the present invention. A battery module and pack 5 in which a plurality of battery modules 6 are stored is formed by a flame-resistant layered molded article 7 as described above according to the present invention, which comprises the fiber sheet material and the thermoplastic resin C.

EXAMPLES

Hereinafter, the present invention will be explained in more detail with reference to Examples, but the present invention is not limited to the description of these Examples. First, the materials used in these Examples and the evaluation method of the respective properties will be explained.
(1) Evaluation Method of Fiber Sheet Material
[Weight Per Unit Area]
The weight of a 30 cm square sample was measured and expressed as the weight (g/m$^2$) per 1 m$^2$.
[Thickness]
It was measured based on JIS L-1913 (2010).
(2) Infusible Fibers a
<Flame Resistant Fiber>
A 7 dtex flame resistant fiber "PYRON" (registered trademark) supplied by Zoltek Corporation was cut to 51 mm and used. When heated by a method based on JIS K7193 (2010), no ignition was observed even at 1,000° C., and the ignition temperature was 1,000° C. or higher. Further, the thermal conductivity was 0.042 W/m·K.
<Carbon Fiber>
A "TORAYCA" (registered trademark) supplied by Toray Industries, Inc. with a diameter of 30 microns was cut to 51 mm and used. The thermal conductivity was 8.4 W/m·K.
(3) Thermoplastic Fibers B
<Drawn Fiber of PPS Fiber>
A drawn PPS fiber of a single fiber fineness of 2.2 dtex (diameter 14 μm), a cut length of 51 mm, "TORCON" (registered trademark) supplied by Toray Industries, Inc., and product number 5371 was used. The LOI value of this PPS fiber was 34. The ratio of sulfur atoms in the fiber was 26.2% by weight.
(4) Thermoplastic Resin C
<Glass Fiber Reinforced PPS Resin>
"TORELINA" (registered trademark) of product number A504-X90B supplied by Toray Industries, Inc. was used. The LOI value of this PPS resin was 47.
<Glass Fiber Reinforced Flame-Retardant PBT Resin>
"TORAYCON" (registered trademark) of product number 1184G-A30N by Toray Industries, Inc. was used. The LOI value of this PBT resin was 32.
<Glass Fiber Reinforced Polyamide 6 Resin>
A molded article body was obtained using a glass fiber reinforced polyamide 6 resin ("AMILAN" (registered trademark) of product number CM1011G-30B2 supplied by Toray Industries, Inc.). The LOI value of this polyamide resin was 24.
(5) Preparation of Fiber Sheet Material
Flame resistant fibers and drawn fibers of PPS fibers were mixed by an opener, then further mixed by a blowing machine, and then passed through a card machine to make a web. The obtained webs were layered by a cross wrap machine and then felted by a water flow entanglement machine to obtain a non-woven fabric composed of drawn fibers of PPS fibers and flame resistant fibers.
(6) Preparation of Flame-Resistant Layered Molded Article
Using a simple tabletop hot press machine (supplied by Imoto Machinery Co., Ltd.), the above-described fiber sheet material and the thermoplastic resin C were hot pressed under the following conditions to obtain a flame-resistant layered molded article of the present invention.

Figure 2:
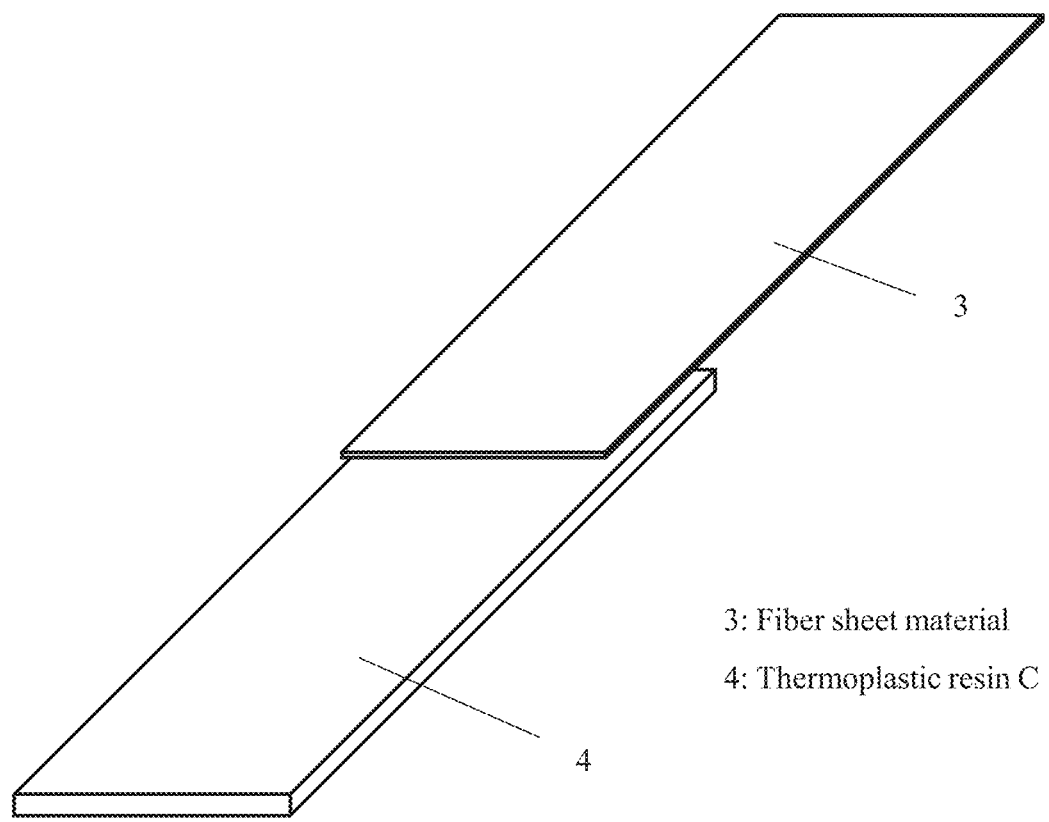
FIG. 2 is a perspective view showing a test piece for measuring joint strength in the flame-resistant layered molded article.

The fiber sheet material was cut into a square shape with a length of 80 mm and a width of 80 mm and a strip shape with a length of 80 mm and a width of 20 mm, and then, from the glass fiber reinforced PPS resin, using an injection molding machine (SE100D, supplied by Sumitomo Heavy Industries, Ltd.), a flat plate having a length of 80 mm, a width of 80 mm and a thickness of 3 mm was prepared under the conditions of a cylinder temperature of 320° C. and a mold temperature of 150° C. Further, a strip-shaped flat plate having a length of 80 mm, a width of 20 mm, and a thickness of 3 mm was also prepared by cutting from the flat plate. The condition of the simple tabletop hot press machine was set to 320° C., which was also the injection molding temperature of PPS, and after pressurizing and preheating at a gauge pressure of 10 kN for 30 seconds, the pressurization of the simple tabletop hot press machine was released, and then, a square-shaped fiber sheet material having a length of 80 mm and a width of 80 mm was placed on the glass fiber reinforced PPS resin flat plate (a flat plate having a length of 80 mm, a width of 80 mm and a thickness of 3 mm), and again pressed at a gauge pressure of 10 kN for 30 seconds to be integrated (hereinafter, the joining method is called also as a hot press joining method), as shown in FIG. 1, a test piece of flame-resistant layered molded article for evaluating flame resistance, having a thickness of 3 mm, which was formed by overlapping the fiber sheet material (1) having a length of 80 mm and a width of 80 mm and the thermoplastic resin C (2), was obtained. Under the similar conditions, as shown in FIG. 2, the glass fiber reinforced PPS resin flat plate (strip-shaped flat plate having a length of 80 mm, a width of 20 mm and a thickness of 3 mm) [thermoplastic resin C (4)] and the strip-shaped fiber sheet material 3 having a length of 80 mm and a width of 20 mm were overlapped at the respective ends by 10 mm and integrated to prepare a strip-shaped test piece having a length of 150 mm and a width of 20 mm for measuring the joint strength in a strip-shaped flame-resistant layered molded article.

(7) Evaluation Method of Flame-Resistant Layered Molded Article

<Test Method of Flame Resistance>

The fiber sheet material surface of the layered molded article shown in FIG. 1 (test piece for evaluation of flame resistance) was flame contacted for 2 minutes, at flame contact conditions based on UL94 5V using a burner (burner angle: 20±5°, methane gas flow rate: 965±30 ml, flame height: 125±10 mm, internal blue flame height: 40±2 mm). During the flame contact, the presence or absence of flame penetration and the presence or absence of ignition was visually confirmed, and 2 minutes after the flame contact, the temperature at the center of the surface of the thermoplastic resin C on the anti-flame contact side was measured by a non-contact thermometer (supplied by FLIR Corporation, product number: CPA-0130A). After the flame contact was finished, the appearance state of the fiber sheet material surface, the appearance state of the thermoplastic resin C surface on the anti-flame contact side, and the internal state of the joint surface were confirmed.

<Test Method of Joint Strength>

Using the layered molded article (joint strength test piece) shown in FIG. 2, a tensile test was carried out using a tensile tester (AG-500C, supplied by Shimadzu Corporation) at a distance between chucks of 50 mm and a tensile speed of 5 mm/min, and the average of 5 samples was taken as the joint strength.

Example 1

As a fiber sheet material, a non-woven fabric having a weight mixing ratio of 60:40 between drawn fibers of PPS fibers and flame resistant fibers was obtained. The weight per unit area was 100 g/m$^2$ and the thickness was 1.21 mm. The obtained non-woven fabric and glass fiber reinforced PPS resin were integrated by a hot press joining method to obtain a flame-resistant layered molded article. In the obtained flame-resistant layered quenched article, the thickness of the compatible welded layer was 70 μm, the joint strength in the tensile test was 4.3 kg/cm$^2$, and the fracture mode after the tensile test was the fracture of the base material of the non-woven fabric that was a good result. In the flame resistance test, there was no penetration of flame or no ignition of the glass fiber reinforced PPS resin, and the maximum temperature at the center of the glass fiber reinforced PPS resin surface on the anti-flame contact side was 188° C. The fiber sheet material on the flame contact side after flame contact had only the surface layer carbonized, and there was no deformation or major change in appearance on the anti-flame contact side and the joint interface, and it had sufficient flame shielding property and flame resistance.

Example 2

The weight mixing ratio between the drawn fibers of the PPS fibers and the flame resistant fibers in the non-woven fabric of Example 1 was changed to 90:10 to obtain a non-woven fabric having a weight per unit area of 100 g/m$^2$ and a thickness of 1.53 mm. The obtained non-woven fabric and the glass fiber reinforced PPS resin were integrated by a hot press joining method in the same manner as in Example 1 to obtain a flame-resistant layered molded article. In the obtained flame-resistant layered molded article, the thickness of the compatible welded layer was 67 μm, the joint strength of the tensile test was 3.9 kg/cm$^2$, and the fracture mode was a fracture of the base material of non-woven fabric which was a good result. In the flame resistance test, there was no penetration of flame or no ignition of the glass fiber reinforced PPS resin, and the maximum temperature at the center of the glass fiber reinforced PPS resin surface on the anti-flame contact side was 221° C. The fiber sheet material on the flame contact side after flame contact had only the surface layer carbonized, and there was no deformation or major change in appearance on the anti-flame contact side and the joint interface, and it had sufficient flame shielding property and flame resistance.

Example 3

The weight mixing ratio between the drawn fibers of the PPS fibers and the flame resistant fibers in the non-woven fabric of Example 1 was changed to 10:90 to obtain a non-woven fabric having a weight per unit area of 100 g/m$^2$ and a thickness of 1.63 mm. The obtained non-woven fabric and the glass fiber reinforced PPS resin were integrated by a hot press joining method in the same manner as in Example 1 to obtain a flame-resistant layered molded article. In the obtained flame-resistant layered molded article, the thickness of the compatible welded layer was 33 μm, the joint strength of the tensile test was 2.3 kg/cm$^2$, and the fracture mode was a fracture of the base material of non-woven fabric which was a good result. In the flame resistance test, there was no penetration of flame or no ignition of the glass fiber reinforced PPS resin, and the maximum temperature at the center of the glass fiber reinforced PPS resin surface on the anti-flame contact side was 208° C. The fiber sheet material on the flame contact side after flame contact had only the surface layer carbonized, and there was no deformation or major change in appearance on the anti-flame contact side and the joint interface, and it had sufficient flame shielding property and flame resistance.

Example 4

As the fiber sheet material of Example 1, using carbon fibers ("Torayca" (registered trademark) supplied by Toray Industries, Inc. with a diameter of 30 microns cut to 51 mm (thermal conductivity: 8.4 W/m·K)) instead of flame resistant fibers, the ratio of the drawn PPS fibers to the carbon fibers was set to 60:40, and a non-woven fabric having a weight per unit area of 100 g/m$^2$ and a thickness of 1.89 mm was obtained. The obtained non-woven fabric and the glass fiber reinforced PPS resin were integrated by a hot press joining method in the same manner as in Example 1 to obtain a layered molded article. In the obtained layered molded article, the thickness of the compatible welded layer was 26 μm, the joint strength of the tensile test was 4.0 kg/cm$^2$, and the fracture mode was a fracture of the base material of non-woven fabric which was a good result. In the flame resistance test, there was no penetration of flame or no ignition of the glass fiber reinforced PPS resin, but the maximum temperature at the center of the glass fiber reinforced PPS resin surface on the anti-flame contact side was 270° C. Significant carbonization and foaming were observed on the surface layer of the fiber sheet material on the flame contact side after flame contact, on the anti-flame contact side, and at the joint interface, and the deformation of the layered molded article was 20 mm or more.

Example 5

A flame-resistant layered molded article was obtained using a glass fiber reinforced flame-retardant PBT resin ("Toraycon" (registered trademark), product number: 1184G-A30N, supplied by Toray Industries, Inc.) instead of the glass fiber reinforced PPS resin of Example 1. The LOI value of this PBT resin was 32. Where, the injection molding temperature conditions at the time of preparing the laminated molded article were changed to a cylinder temperature of 260° C. and a mold temperature of 80° C. The temperature condition at the time of hot pressing was changed to 260° C., and the other conditions were the same as in Example 1. In the obtained flame-resistant layered molded article, the thickness of the compatible welded layer was 0 μm, and the non-woven fabric was only impregnated with resin. The joint strength in the tensile test was 1.5 kg/cm², and the fracture mode was a fracture of the joint interface. Although the flame did not penetrate in the flame resistance test, the flame ignited in the glass fiber reinforced flame-retardant PBT resin part of the layered molded article end surface, but it was self-extinguished after the flame contact was finished. The maximum temperature at the center of the glass fiber reinforced flame-retardant PBT resin surface on the anti-flame side was 190° C. The surface layer of the fiber sheet material on the flame contact side after the flame contact was only carbonized, but a distortion deformation with a height of about 1 mm was observed on the anti-flame contact side. The fiber sheet material on the flame contact side after flame contact was carbonized only at its surface layer, and there is no great deformation or great change in appearance on the anti-flame side and the joint interface, and it had sufficient flame shielding property and flame resistance.

Example 6

As the fiber sheet material of Example 1, a non-woven fabric having a weight per unit area of 100 g/m² and a thickness of 2.02 mm was obtained using 100% flame-resistant fibers. The obtained non-woven fabric and the glass fiber reinforced PPS resin were integrated by a hot press joining method in the same manner as in Example 1 to prepare a layered molded article. In the obtained flame-resistant layered molded article, the thickness of the compatible welded layer was 0 μm, and the non-woven fabric was only impregnated with resin. The joint strength in the tensile test was 1.5 kg/cm², and the fracture mode was a fracture of the joint interface. In the flame resistance test, neither the flame penetrated nor the glass fiber reinforced PPS resin was ignited, but the maximum temperature at the center of the glass fiber reinforced PPS resin surface on the anti-flame side was 212° C. The fiber sheet material on the flame contact side after flame contact was carbonized only at its surface layer, and there is no deformation or great change in appearance on the anti-flame side and the joint interface, and it had sufficient flame shielding property and flame resistance.

Comparative Example 1

A layered molded article was obtained using a glass fiber reinforced polyamide 6 resin ("Amilan" (registered trademark), product number: CM1011G-30B2, supplied by Toray Industries, Inc.) instead of the glass fiber reinforced PPS resin of Example 1. The LOI value of this polyamide resin was 24. Where, the injection molding temperature conditions at the time of preparing the layered molded article were changed to a cylinder temperature of 260° C. and a mold temperature of 80° C. The temperature condition at the time of hot pressing was changed to 260° C., and the other conditions were the same as in Example 1. The thickness of the compatible welded layer in the obtained layered molded article was 0 μm, and the non-woven fabric was only impregnated with resin. The joint strength in the tensile test was 1.3 kg/cm², and the fracture mode was a fracture of the joint interface. Although the flame did not penetrate in the flame resistance test, the flame ignited in the glass fiber reinforced polyamide 6 resin part of the layered molded article end surface, and the flame was not self-extinguished for about 10 seconds after the flame contact was finished. The maximum temperature at the center of the glass fiber reinforced polyamide 6 resin surface on the anti-flame side was 198° C. The surface layer of the fiber sheet material on the flame contact side after the flame contact was only carbonized, but a distortion deformation with a height of about 1 mm was observed on the anti-flame contact side.

TABLE 1

|  |  | Example 1 | Example 2 | Example 3 | Example 4 | Example 5 | Example 6 | Comparative Example 1 |
|---|---|---|---|---|---|---|---|---|
| Infusible fibers A | Flame resistant fibers (% by weight) | 40 | 10 | 90 |  | 40 | 100 | 40 |
|  | Carbon fibers (% by weight) |  |  |  | 40 |  |  |  |
| Thermoplastic fibers B | PPS fibers (% by weight) | 60 | 90 | 10 | 60 | 60 |  | 60 |
| Fiber sheet material | Weight per unit area (g/m²) | 100 | 100 | 100 | 100 | 100 | 100 | 100 |
| Thermoplastic resin C | PPS fibers (% by weight) | ○ | ○ | ○ | ○ |  | ○ |  |
|  | Flame-retardant PBT resin |  |  |  |  | ○ |  |  |
|  | PA6 resin |  |  |  |  |  |  | ○ |
|  | LOI value | 47 | 47 | 47 | 47 | 31 | 47 | 24 |
| Compatible welded layer | Thickness (μm) | 70 | 67 | 33 | 26 | 0 | 0 | 0 |
| Test result of joint strength | Joint strength (kg/cm²) | 4.3 | 3.9 | 2.3 | 4.0 | 1.5 | 1.5 | 1.3 |
|  | Fracture mode | base material | base material | base material | base material | joint interface | joint interface | joint interface |
| Test result of flame resistance | Presence of penetration of flame | none | none | none | none | none | none | none |
|  | Presence of ignition | none | none | none | none | present | none | present |
|  | Temperature of anti-flame contact side (° C.) | 188 | 221 | 208 | 270 | 190 | 212 | 198 |

TABLE 1-continued

|  | Example 1 | Example 2 | Example 3 | Example 4 | Example 5 | Example 6 | Comparative Example 1 |
|---|---|---|---|---|---|---|---|
| Deformation of layered molded article | none | none | none | present | present | none | present |
| State of flame contact surface | carbonized | carbonized | carbonized | carbonized and foamed | carbonized | carbonized | carbonized |
| State of joint interface | no change | no change | no change | carbonized and foamed | no change | no change | no change |
| State of anti-flame contact surface | no change | no change | no change | carbonized and foamed | no change | no change | no change |

INDUSTRIAL APPLICABILITY

The flame-resistant layered molded article according to the present invention is excellent in its high flame shielding property and flame resistance even when the fiber sheet material side comes into contact with a flame, and therefore, its shape and properties can be maintained, and it is applied to the fields of housing, aircraft, automobiles, etc. In particular, it can be suitably used for a battery module and pack, which is mounted on xEV automobiles and is provided with flame resistance standards in national regulations from the viewpoint of safety.

EXPLANATION OF SYMBOLS 1, 3: fiber sheet material
2, 4: thermoplastic resin C
5: battery module and pack
6: battery module
7: flame-resistant layered molded article

The invention claimed is:

1. A battery pack comprising a plurality of battery modules contained in a flame-resistant layered molded article,
    wherein the molded article comprises a fiber sheet material and a thermoplastic resin C,
    wherein one surface of the fiber sheet material of the molded article comprises at least infusible fibers A and thermoplastic fibers B, wherein the fiber sheet material is exposed to the outside of the molded article, and wherein at least a part of the other surface side of the fiber sheet material is joined to the thermoplastic resin C that is injection molded, thereby forming the molded article body,
    wherein a thermal conductivity of the infusible fibers A determined based on ISO22007-3 (2008) is 0.060 W/m·K or less,
    wherein the infusible fiber A is selected from the group consisting of a flame resistant fiber, meta-aramid-based fiber, and glass fiber,
    wherein the fiber sheet material containing the infusible fibers A and the thermoplastic fibers B is thermally welded with the thermoplastic resin C, and
    wherein the thickness of a compatible welded layer formed between the thermoplastic fibers B and the thermoplastic resin C is 10 μm or more and 70 μm or less.

2. The battery pack-according to claim 1, wherein a content of the infusible fibers A in the fiber sheet material is 15 to 80% by weight.

3. The battery pack according to claim 1, wherein a content of the thermoplastic fibers B in the fiber sheet material is 20 to 85% by weight.

4. The battery pack according to claim 1, wherein the fiber sheet material contains 20% by weight or less of fibers D other than the infusible fibers A and the thermoplastic fibers B.

5. The battery pack according to claim 1, wherein the infusible fibers A are flame resistant fibers or meta-aramid-based fibers.

6. The battery pack according to claim 1, wherein a limiting oxygen index (LOI) value of the thermoplastic fibers B determined based on JIS K7201-2 (2007) is 25 or more and 65 or less.

7. The battery pack according to claim 1, wherein the thermoplastic fibers B are fibers comprising a resin selected from the group consisting of an anisotropic fusible polyester, a liquid crystal polyester, a flame-retardant poly (butylene terephthalate), a poly (acrylonitrile butadiene styrene), a flame-retardant polysulfone, a poly (ether-ether-ketone), a poly (ether-ketone-ketone), a polyethersulfone, a polyarylate, a polyarylene sulfide, a polyphenylsulfone, a polyetherimide, a polyamideimide and a mixture thereof.

8. The battery pack according to claim 1, wherein the thermoplastic fibers B are fibers containing 15% by weight or more and 50% by weight or less of sulfur.

9. The battery pack according to claim 1, wherein a limiting oxygen index (LOI) value of the thermoplastic resin C determined based on JIS K7201-2 (2007) is 25 or more and 65 or less.

10. The battery pack according to claim 1, wherein the thermoplastic resin C comprises a resin selected from the group consisting of an anisotropic fusible polyester, a liquid crystal polyester, a flame-retardant polyamide 66, a flame-retardant poly (butylene terephthalate), a poly (acrylonitrile butadiene styrene), a flame-retardant polysulfone, a poly (ether-ether-ketone), a poly (ether-ketone-ketone), a polyethersulfone, a polyarylate, a polyarylene sulfide, a polyphenylsulfone, a polyetherimide, a polyamideimide and a mixture thereof.

11. The battery pack according to claim 1, wherein the thermoplastic fibers B and the thermoplastic resin C are made of the same resin, and a joint strength between the fiber sheet material containing the infusible fibers A and the thermoplastic fibers B and the thermoplastic resin C is 1.5 kg/cm$^2$ or more and 4.3 kg/cm$^2$ or less.

12. The battery pack according to claim 1, wherein the fiber sheet material containing the infusible fibers A is partially present on a surface of the thermoplastic resin C.

13. The battery pack according to claim 1, wherein the molded article has a flame resistance at flame contact conditions based on UL 94 5V using a burner.

14. The battery pack according to claim 1, wherein in the molded article, said outside of the fiber sheet material containing the least infusible fibers A and thermoplastic fibers B is exposed to a flame, and the fiber sheet material containing the infusible fibers A and the thermoplastic fibers B is formed as the fiber sheet material capable of exhibiting a flame shielding property by forming a film between the infusible fibers A by melting the thermoplastic fibers B and carbonizing the film under an oxygen blocking condition.

* * * * *